US012561483B2

(12) United States Patent
Janke et al.

(10) Patent No.: US 12,561,483 B2
(45) Date of Patent: Feb. 24, 2026

(54) SEMICONDUCTOR CHIP APPARATUS AND METHOD FOR CHECKING THE INTEGRITY OF A MEMORY

(71) Applicant: Infineon Technologies AG, Neubiberg (DE)

(72) Inventors: Marcus Janke, Munich (DE); Steffen Sonnekalb, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 182 days.

(21) Appl. No.: 18/311,981

(22) Filed: May 4, 2023

(65) Prior Publication Data

US 2023/0367912 A1 Nov. 16, 2023

(30) Foreign Application Priority Data

May 12, 2022 (DE) .......................... 102022111925.4

(51) Int. Cl.
G06F 21/64 (2013.01)
G06F 21/79 (2013.01)

(52) U.S. Cl.
CPC .............. G06F 21/64 (2013.01); G06F 21/79 (2013.01)

(58) Field of Classification Search
CPC ....... G06F 21/64; G06F 21/79; H04L 63/083; H04L 63/0876; H04L 63/123
See application file for complete search history.

(56) References Cited

U.S. PATENT DOCUMENTS

| | | | | |
|---|---|---|---|---|
| 6,792,286 B1 * | 9/2004 | Bharath | ................ | H04W 84/14 |
| | | | | 455/426.2 |
| 7,814,396 B2 * | 10/2010 | Janke | ............... | G06K 19/07372 |
| | | | | 714/766 |
| 9,612,979 B2 * | 4/2017 | Chew | .................. | G06F 12/1441 |
| 11,327,836 B1 * | 5/2022 | Wu | ..................... | G06F 11/1068 |
| 2002/0046385 A1 * | 4/2002 | Boehm | .................. | G11C 29/52 |
| | | | | 714/799 |
| 2005/0060602 A1 * | 3/2005 | Battaia | ................ | G06F 11/1008 |
| | | | | 714/E11.034 |
| 2012/0159283 A1 * | 6/2012 | Lu | .......................... | H03M 13/05 |
| | | | | 714/763 |
| 2014/0006730 A1 * | 1/2014 | Zain | .................... | G06F 13/1673 |
| | | | | 711/155 |

(Continued)

FOREIGN PATENT DOCUMENTS

| | | | |
|---|---|---|---|
| DE | 102017202611 A1 * | 8/2018 | |
| EP | 3136285 B1 | 9/2018 | |

OTHER PUBLICATIONS

Jan. 13, 2023 (DE) Office Action—App. 102022111925.4.

*Primary Examiner* — Khalid M Almaghayreh
(74) *Attorney, Agent, or Firm* — Banner & Witcoff, Ltd.

(57) ABSTRACT

A semiconductor chip apparatus including a memory having a plurality of memory locations, a memory access element, and an integrity check device configured to store a reference value for a check function over values stored in the memory locations and, in a case of write access to a memory location, configured to update a check value with the value to be written by the write access if the check value represents the value stored in the memory location prior to the write access, and configured to compare the reference value with the check value after the check value has been generated and output a signal depending on a result of the comparison.

13 Claims, 5 Drawing Sheets

(56)          References Cited

U.S. PATENT DOCUMENTS

2017/0060779 A1* 3/2017 Falk ........................ G06F 21/78
2020/0371872 A1* 11/2020 Fuller ................... G11C 29/52
2023/0051590 A1* 2/2023 Tkacik ............... G06F 11/1076

* cited by examiner

Figure 5:
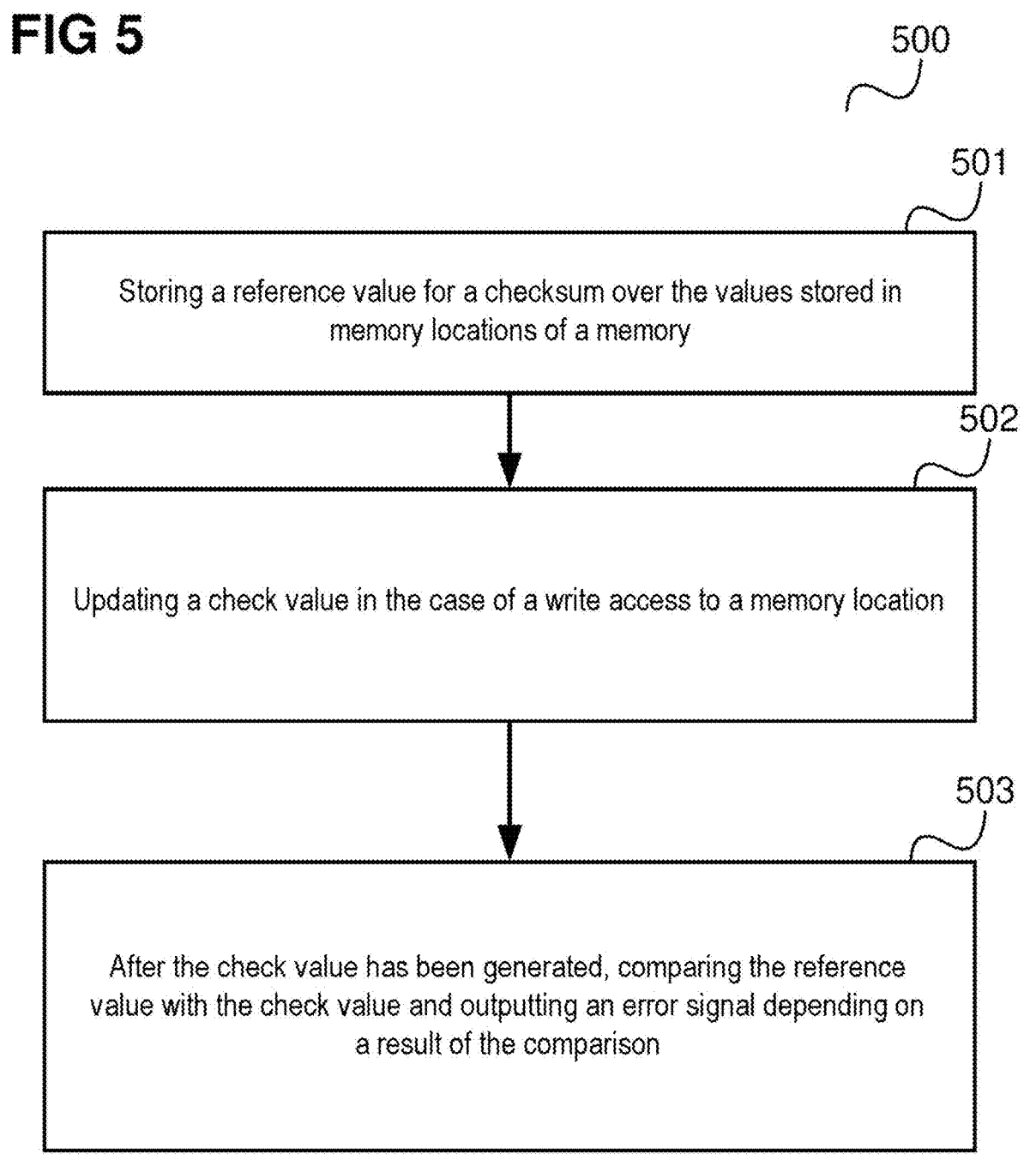

Storing a reference value for a checksum over the values stored in memory locations of a memory

502

Updating a check value in the case of a write access to a memory location

503

After the check value has been generated, comparing the reference value with the check value and outputting an error signal depending on a result of the comparison

SEMICONDUCTOR CHIP APPARATUS AND METHOD FOR CHECKING THE INTEGRITY OF A MEMORY

TECHNICAL FIELD

Exemplary aspects relate generally to semiconductor chip apparatuses such as data processing apparatuses and data memories and methods for checking the integrity of a memory.

BACKGROUND

Electronic equipment must be protected against attacks in a variety of applications. Typical examples are security ICs, hardware roots of trust (e.g., trusted platform modules), smart cards that process and store secret data (e.g., keys or passwords) or data that should be protected against manipulation (e.g., credit on a credit card), or else controllers, for example in a vehicle, whose correct function is important for the safety of a user. A possible point of attack for a piece of electronic equipment is its memory, by the manipulation of which an attacker can learn secret data or impair the correct functioning of the electronic equipment. Therefore, mechanisms that effectively protect electronic memories against attacks (and also against spontaneous errors that are not traced back to an attack) are desirable.

According to an aspect, a semiconductor chip apparatus is provided, the latter comprising a memory having a multiplicity of memory locations, a memory access element, and an integrity checking device configured to store a reference value for a check function over values stored in the memory locations and, in the case of write access to a memory location, configured to update a check value using the value to be written by the write access should the check value represent the value stored in the memory location prior to the write access, and configured to compare the reference value with the check value after the check value has been generated and output a signal depending on a result of the comparison.

According to a further aspect, a method is provided for checking the integrity of a memory in accordance with the semiconductor chip apparatus described above.

BRIEF DESCRIPTION OF THE DRAWINGS

The figures do not reflect the actual proportions but are intended to illustrate the principles of the various exemplary aspects. Various exemplary aspects are described below with reference to the following figures.

FIG. 5 shows a flowchart illustrating a method for checking the integrity of a memory according to an exemplary aspect.

DETAILED DESCRIPTION

The following detailed description relates to the attached figures, which show details and exemplary aspects. These exemplary aspects are described in such great detail that a person skilled in the art can carry out the aspects of disclosed subject matter. Other aspects are also possible and the exemplary aspects can be modified in structural, logic and electrical terms without departing from the subject matter of the disclosure. The different exemplary aspects are not necessarily mutually exclusive; rather, different aspects can be combined with each other, resulting in new aspects.

Figure 1:
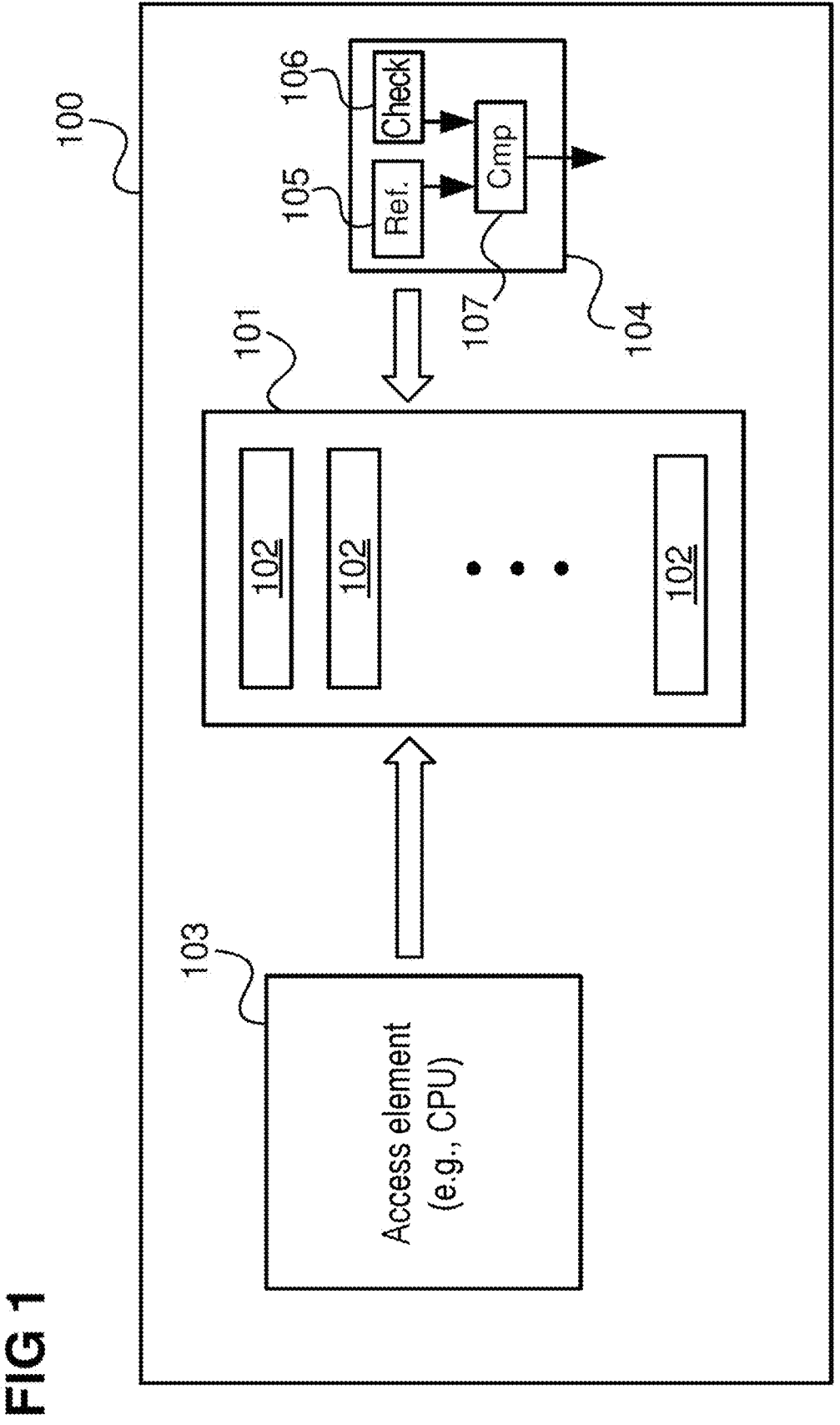
FIG. 1 shows a data processing apparatus according to an exemplary aspect.

FIG. 1 shows a data processing apparatus 100.

The data processing apparatus 100 may be any type of data processing apparatus, such as a computer or a smartphone, a smart card (of any form factor) or a control device (e.g., with a microcontroller) used in a vehicle, for example, or an IoT (Internet of Things) apparatus or IoT equipment.

The data processing apparatus 100 has a memory 101 containing memory locations 102. Each memory location 102 is formed by a group of memory cells, for example SRAM (Static Random Access Memory) cells or memory cells of another memory type, and allows the storage of a value (with a range of values dependent on the number of bits that can be stored by means of the group of memory cells).

A memory access element 103 accesses the memory 101, which is to say reads and/or writes data from and/or to the memory 101. The memory access element 103 may, for example, be a processor (e.g., a CPU) of the data processing apparatus 100 (or else correspond to an application executed on the processor or a process executed on the processor), which reads from the memory 101 both data to be processed or program code to be executed, and writes results of the processing or execution to the memory 101.

However, the memory access element 103 may also be another element such as a cache controller, for example. For example, if the memory 101 is a cache memory, there may be a further memory for which the memory 101 is provided as cache memory, and a cache controller writes to the memory 101 for buffering ("caching") values from the further memory.

Values stored in the memory 101 are subject to attacks or else spontaneous errors (glitches) and can thus be changed. In security-critical and safety-critical applications such as many smart cards and control devices for vehicles, it is particularly important to detect such changes and hence attacks in particular.

In order to prevent attacks on the memory 101, the memory integrity can thus be monitored as a countermeasure in order to detect changes to the memory content caused, for example, by current peaks and disturbances, light or laser radiation, electromagnetic pulses, radioactive radiation, thermal effects or other effects.

This kind of memory integrity monitoring as such a countermeasure against attacks can be performed, for example, using:

EDC (error detection code): Additional memory areas are provided for memory locations and these memory areas each store a type of checksum for the respective memory area. However, many such checksums must be stored for a memory, leading to a significant increase in the required chip area.

Parity: Only one bit is stored for a memory area in order to identify whether an odd or even number of bits is stored in the memory area. However, error detection capabilities are very low in this case.

Digital signature: The content of the memory is cryptographically hashed and each check value thus determined is compared with a respective expected value. However, a new check value must then be calculated for new contents and the contents of all memory cells to be protected must always be hashed. This leads to a loss of performance.

PFD (Post Failure Detection): The memory's intended use (e.g., a CPU access) is suspended, and an integrity checking device (implementing a state machine) performs a sequential checksum calculation by accessing the memory content of the memory. However, the interruption for example impedes data processing by the CPU and for example impedes the execution of an application, which is to say this interruption leads to a loss of performance.

A mechanism for checking the integrity of a memory is provided according to various aspects, and it allows the integrity of the memory 101 to be checked in parallel with accesses to the memory by a memory access element 103; this is referred to as an OAC (online array check). In the process, a checksum (in general the value of a check function) is calculated during running operation (i.e., at runtime) and is determined as one of the two inputs (reference for the checksum or current check value for the checksum) for a PFD-type verification. The mechanism can be implemented efficiently in terms of area and leads to only a small loss of performance since the calculation of the checksum does not (at least in most cases) impede accesses to the memory by the memory access element 103.

According to various aspects, an integrity checking device 104 which accesses the memory 101 is provided. The integrity checking device 104 may be implemented in hardware or else in software running on a processor. The processor implementing the integrity checking device 104 may also be the same processor implementing the memory access element 103. For example, a processor executes two processes, one corresponding to the memory access element 103 (e.g., an application) and one implementing the integrity checking device 104.

The integrity checking device 104 has a first memory area 105 for a reference value and a second memory area 106 for a (current) check value of the checksum. The memory areas 105, 106 are, for example, registers or memory areas in a working memory of the data processing apparatus 100, depending on the implementation of the integrity checking device 104. Furthermore, the integrity checking device 104 comprises a comparator 107 (which may be a hardware circuit or a programmed function, depending on the implementation of the integrity checking device).

The integrity checking device 104 calculates checksums over the contents of the memory locations 102 at various times. If at a first time it has completed the calculation of a checksum over the contents of the memory locations 102 (i.e., over the values stored therein), it stores this sum as a reference value in the first memory area (reference memory area) 105. Alternatively, the reference value may also be generated by initializing writing to the memory area to be protected. Then, it starts anew to calculate a checksum over the contents of the memory locations 102 as a check value. Since the integrity checking device 104 reads the memory locations 102 for this purpose (and thus any changes to the memory locations are included in the check value) and this reading does not occur simultaneously for all memory locations 102, the integrity checking device 104 generates the check value over a certain period of time, with the second memory area (check value memory area) 106 always storing the current status of this check value. The integrity checking device 104, by starting from an initial value (typically zero) thus updates the check value for each memory location read out (e.g., by XOR-combining the previous value with the value read out) and stores the result in the second memory area 106, which accordingly can also be seen as an accumulator.

Once it has finished calculating the check value (i.e., it has read out all the memory locations and updated the check value with the values read out from them, so that the check value in this sense contains all the values read out), it compares the check value with the reference value. If the two do not match, it interprets this as an error (possibly caused by an attack) and outputs an alarm signal (or error signal) to which other components of the data processing apparatus 100 can respond appropriately, for example by stopping processing, resetting, warning a user, etc.

If the check value matches the reference value, the integrity checking device 104 starts to calculate a new check value.

According to various aspects, provision is made of a mechanism which allows this periodic procedure (with one period being the time between two comparisons) to be implemented during the operation of the memory access element, which is to say while the memory access element also accesses the memory 101 and possibly changes contents of memory locations in the process. This mechanism is explained below with reference to FIG. 2 and FIG. 3. What should be noted in this respect is that the reference value and optionally also the check value have to be appropriately adapted during a desired change (write access) so that the intended change is not identified as an error.

Figure 2:
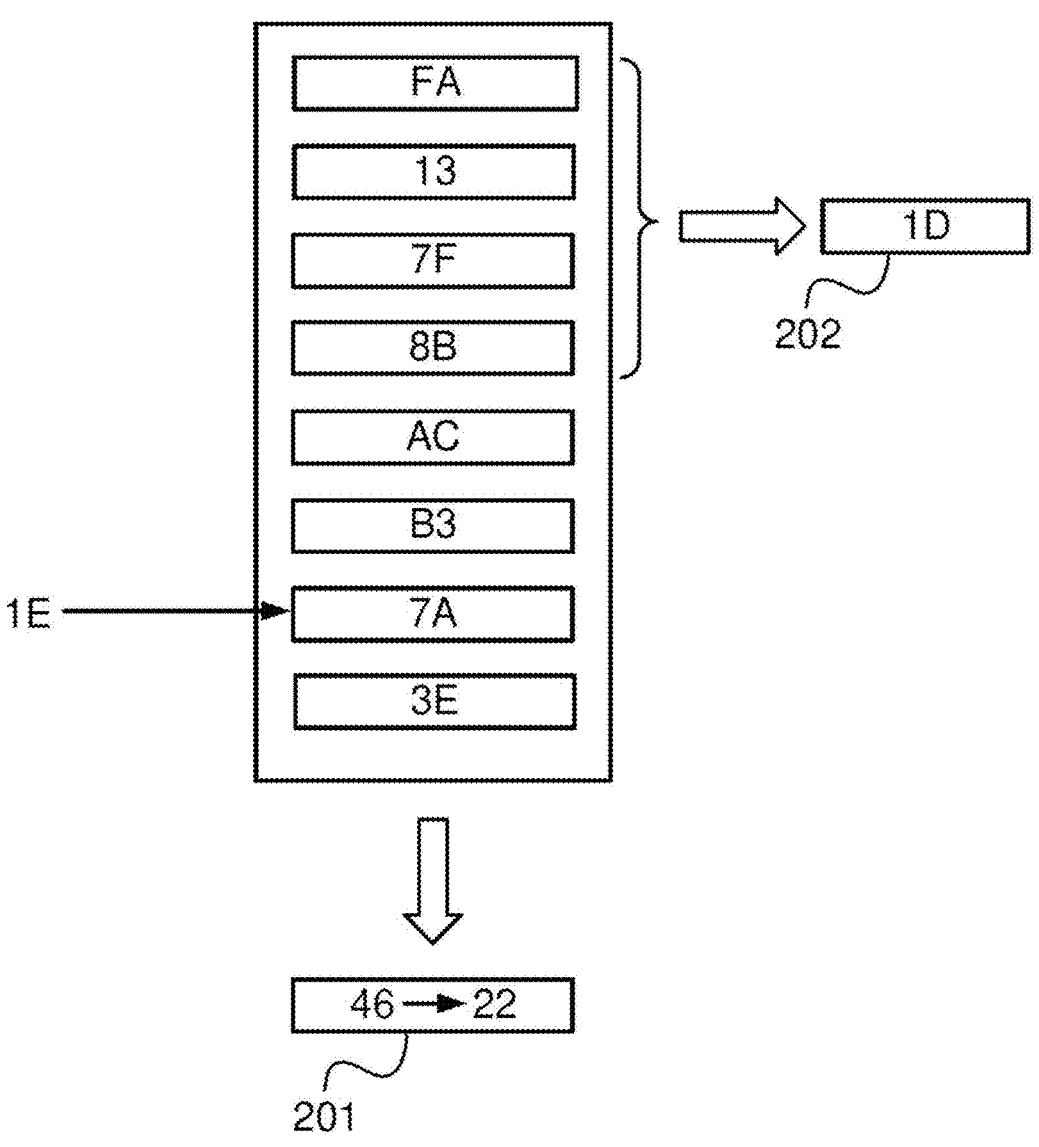
FIG. 2 shows an example of write access to a memory.

FIG. 2 shows an example of a write access.

For simplicity, the memory 101 has only eight memory locations. In practice, the memory 101 can have many more memory locations. However, a total memory comprising a plurality of such memories 101 (e.g., each having an integrity checking device 104) may also be provided to allow more frequent checking to take place (as fewer memory locations need to be read out before checking, which is to say a comparison, can take place).

In this example, each memory location 102 stores an 8-bit value, represented in hexadecimal format. This only serves as an example to simplify things, and each memory location may also store more bits, for example 32 bits or 64 bits.

The integrity checking device 104 is assumed to have calculated a reference value 201 over the values at a previous time, for example by XOR-combining the stored values, so that the reference value 201 is also an 8-bit value.

In the time since the integrity checking device 104 determined or set the reference value 201 (e.g., following a previous comparison between reference value and previous check value), it started the calculation of a (current) check value 202. To this end, it reads out the memory locations sequentially and accumulates the read values (e.g., by an XOR combination).

The assumption is made that at a time illustrated in FIG. 2, the integrity checking device 104 proceeds from top to bottom and has accumulated the values of the first four memory locations. Next, a write access by the memory access element takes place. The seventh memory location is to be overwritten in the process, in this example the value 7A by the value 1E.

Since this affects the reference value, the integrity checking device 104 adjusts the reference value accordingly by replacing 7A with 1E:

$$\text{Reference\_value\_new} = \text{Reference\_value\_old} + 7A + 1E = 46 + 7A + 1E = 22$$

wherein the XOR combination is written as '+'. To do this, it reads the old value 7A before writing the new value 1E into the memory location.

Additionally, the integrity checking device 104 checks whether the write access affects the current check value. This is not the case since the memory access takes place at the seventh memory location and since the check value only includes (contains) the first four values and the write access changes the seventh value.

Figure 3:
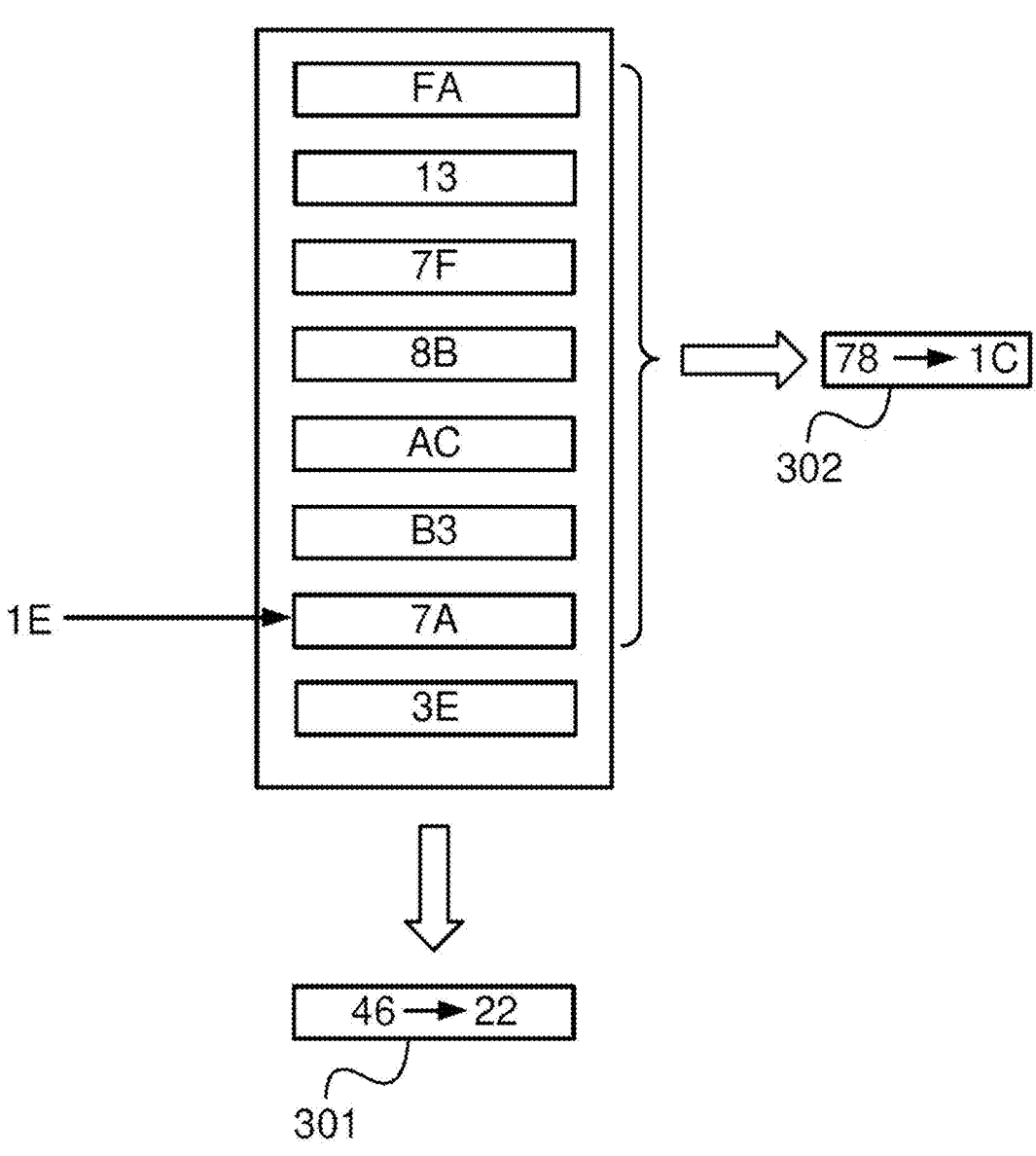
FIG. 3 shows a further example of write access to the memory.

FIG. 3 shows a further example of a further access to memory locations.

The memory access is the same as in the example of FIG. 2. However, the assumption in this case is that it occurs at a later time, at which the integrity checking device 104 has already calculated the check value 302 to such an extent that the latter includes the values of the first seven memory locations.

With regard to the reference value 301, the integrity checking device 104 changes nothing in relation to the example from FIG. 2; it must be once again adjusted accordingly by said integrity checking device according to $$Reference\_value\_new = Reference\_value\_old + 7A + 1E = 46 + 7A + 1E = 22.$$

However, in contrast with the example of FIG. 2, the memory access also affects the check value 302 in this example since the value of the seventh memory location has already been included in the check value. This is detected by the integrity checking device 104, which adjusts the check value 302 according to $$Check\_value\_new = Check\_value\_old + 7A + 1E = 78 + 7A + 1E = 1C.$$

To do this, it reads the old value 7A before writing the new value 1E into the memory location.

This allows the integrity checking device 104 to correctly calculate the reference value and the check value even when write accesses to the memory 101 are performed. Hence, the memory access element 103 need not be suspended for the duration of the calculation of the check value (or need not be prohibited from accessing the memory 101) since the reference value and the check value are always adjusted appropriately.

However, a further problem arises when the integrity checking device 104 intends to read a memory location of the memory 101 in order to calculate the check value at any one time but the memory access element intends to (read or write) access the memory 101 at the same time. Such a collision can be resolved in different ways according to different aspects:

A dual port memory is used as the memory, with one port being used by the memory access element 103 and one port being used by the integrity checking device 104. This enables simultaneous access to the memory.

The integrity checking device 104 awaits a time at which the memory access element 103 does not access the memory 101. To increase the frequency of such times, it is possible to subdivide a total memory of the data processing apparatus 100 into a plurality of memories 101. Even if the memory is not subdivided in this way, there typically is idling during the processing (e.g., a wait state), during which the memory access element 103 (e.g., a CPU) does not access the memory 101 and the latter can be accessed by the integrity checking device 104. Provision can also be made for the integrity checking device 104 to be able to block accesses to the memory 101 by the memory access element 103 should the integrity checking device 104 be afforded too infrequent access to the memory 101 to gain a sufficient number of accesses within a period to calculate the check value. For example, if the memory 101 has 1000 memory locations, if an access takes one clock cycle and if a period length of 4000 clock cycles (i.e., an integrity check every 4000 clock cycles) is provided, then it is sufficient for the integrity checking device 104 to be granted access to the memory 101 every fourth clock cycle on average. For example, if said integrity checking device has not been granted access for three cycles, then it may block accesses by the memory access element 103 in order to reliably achieve this average.

Figure 4:
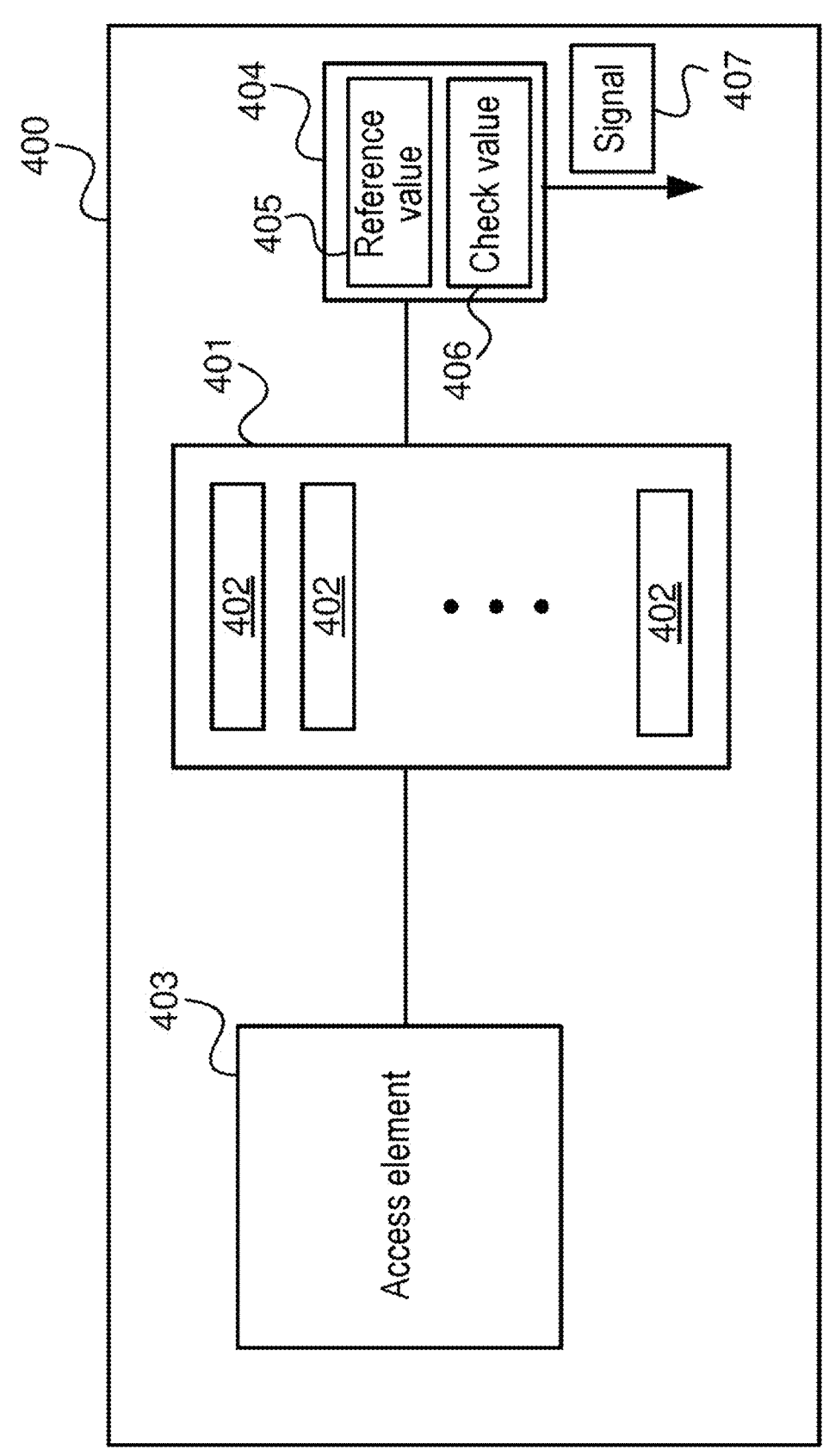
FIG. 4 shows a semiconductor chip apparatus according to an exemplary aspect.

In summary, according to various aspects, a semiconductor chip apparatus as shown in FIG. 4 is provided.

FIG. 4 shows a semiconductor chip apparatus 400 (i.e., an apparatus with or consisting of one or more semiconductor chips) according to an exemplary aspect.

The data processing apparatus 400 comprises a memory 401 with a multiplicity of memory locations 402 and a memory access element 403.

The data processing apparatus 400 also comprises an integrity checking device 404 which is configured to store a reference value 405 for a checksum over values stored in the memory locations 402, to update a check value 406 using the value to be written by the write access in the case of write access to a memory location should the check value 406 represent (i.e., contain) the value stored in the memory location prior to the write access, and to compare the reference value 405 with the check value 406 after the check value has been generated (i.e., after the check value has been generated by reading all stored values) and output a signal 407 depending on a result of the comparison.

In other words, different aspects enable an integrity check of a memory on the basis of a check value of a check function to be implemented during operation (i.e., without pausing processing that accesses the memory) by virtue of the check value being adjusted, if required, in the case of write access. This avoids losses in the processing performance caused by the integrity check. The integrity check requires significantly less area in comparison with an integrity check by means of EDCs since it is only necessary to store two values for the check function (reference value and check value for the check function).

It is not necessary for the memory locations 402 to include all the memory locations in the memory 401, which is to say the method may also be applied to a subset of the memory locations of a memory.

The check function is, for example, a checksum such as an XOR operation of the stored values or, more generally, a commutative operation of a mapping of the contents of the memory locations to be checked is generated, which is to say if the values are $W_0, W_1, \ldots W_n$, then the check value is equal to $f_0(W0) + f_1(W1) + \ldots f_n(W_n)$ with mappings (e.g., weights) $f_0 \ldots f_n$.

According to various aspects, a method as shown in FIG. 5 is carried out.

FIG. 5 shows a flowchart 500 illustrating a method for checking the integrity of a memory.

In 501, a reference value for a check function over the values stored in memory locations of a memory is stored.

In the case of a write access to a memory location, a check value is updated in 502 using the value to be written by the write access should the check value represent the value stored in the memory location prior to the write access.

The reference value and the check value are compared in 503 after the check value has been generated and a signal is output depending on a result of the comparison.

According to an aspect, a data processing apparatus is provided, the latter comprising storage means for storing a reference value for a checksum over the values stored in memory locations of a memory, updating means for updating a check value using the value to be written by the write access in the case of write access to a memory location should the check value represent the value stored in the memory location prior to the write access, and comparison means for comparing the reference value with the check value after the check value has been generated, and for outputting an error signal depending on a result of the comparison.

Various exemplary aspects are stated below.

Exemplary aspect 1 is a semiconductor chip apparatus as described with reference to FIG. 4.

Exemplary aspect 2 is a semiconductor chip apparatus according to exemplary aspect 1, wherein the integrity checking device is configured to form the check value during times at which the access element need not provide any data for other receivers.

Exemplary aspect 3 is a semiconductor chip apparatus according to exemplary aspect 2 or 3, wherein the integrity checking device is configured to generate the check value for the check function by virtue of reading the memory locations and, proceeding from an initial value, updating the check value for each read memory location using the value read from the memory location such that the check value contains the value, wherein the integrity checking device is configured, in the case of write access to the memory by the memory access element, to verify whether the write access should be to a memory location that stores a value which said integrity checking device has already used to update the check value for the check function, and configured, if the write access should be to a memory location that stores a value which said integrity checking device has already used to update the check value for the check function, to re-read the memory location and adapt the check value such that the latter contains the value to be written by the memory access rather than the read value.

Exemplary aspect 4 is a semiconductor chip apparatus according to any one of exemplary aspects 1 to 3, wherein the check function is a commutative operation on a mapping of the stored values.

Exemplary aspect 5 is a semiconductor chip apparatus according to exemplary aspect 4, wherein the commutative operation is an XOR combination.

Exemplary aspect 6 is a semiconductor chip apparatus according to any one of exemplary aspects 1 to 5, wherein the integrity checking device is configured to generate the reference value such that the latter represents the values stored in the memory locations, and configured to adjust the reference value during the write access such that said reference value represents the value to be written by the write access rather than the value stored in the write-accessed memory cell prior to said write access.

Exemplary aspect 7 is a semiconductor chip apparatus according to any one of exemplary aspects 1 to 6, wherein the memory is a dual port memory with a first port and a second port, the memory access element is configured to access the memory by means of the first port, and the integrity checking device is configured to read the stored values by means of the second port.

Exemplary aspect 8 is a semiconductor chip apparatus according to any one of exemplary aspects 1 to 6, wherein, for the purpose of reading one of the stored values in order to generate the check value, the integrity checking device is configured to await a time at which the memory access element does not access the memory.

Exemplary aspect 9 is a semiconductor chip apparatus according to exemplary aspect 8, wherein the integrity checking device is configured to prohibit access to the memory by the memory access element and to perform a read access to generate the check value on the memory instead if said integrity checking device should otherwise have to wait for longer than a maximum period of time for a time at which the memory access element does not access the memory.

Exemplary aspect 10 is a semiconductor chip apparatus according to any one of exemplary aspects 1 to 9, wherein the memory access element is a data processing unit that accesses the memory, the memory being a random access memory, or one or more registers.

Exemplary aspect 11 is a semiconductor chip apparatus according to any one of exemplary aspects 1 to 10, wherein the integrity checking device is configured to output the signal when the reference value does not match the check value.

Exemplary aspect 12 is a semiconductor chip apparatus according to any one of exemplary aspects 1 to 11, wherein the one integrity checking device is configured to periodically generate the check value, compare the latter to the reference value, and output the signal depending on a result of the comparison.

Exemplary aspect 13 is a method for checking the integrity of a memory as described above with reference to FIG. 5.

Exemplary aspects described in the context of the semiconductor chip apparatus apply analogously to the method for checking the integrity of a memory.

The method of FIG. 5 may be performed by one or more computers (or, more generally, semiconductor chip apparatuses) having one or more data processing units. The term "data processing unit" can be understood as any type of entity that enables the processing of data or signals. For example, the data or signals may be handled according to at least one (i.e., one or more than one) specific function performed by the data processing unit. A data processing unit may be an analog circuit, a digital circuit, a logic circuit, a microprocessor, a microcontroller, a central processing unit (CPU), a graphics processing unit (GPU), a digital signal processor (DSP), a crypto-processor, a cache controller, a DMA controller, an integrated circuit of a programmable gate array (FPGA), or any combination thereof. Any other means of implementing the respective functions described in more detail herein may also be understood as a data processing unit or logic circuitry. One or more of the method steps described in detail herein may be performed (e.g., implemented) by a data processing unit through one or more specific functions performed by the data processing unit. One or more such data processing units may implement one or more data processing devices. By way of example, the integrity checking device is configured to generate the check value while a data processing unit executes a program which processes values stored by the memory and/or which contains instructions stored by the memory. By way of example, the data processing unit is the memory access element in that case.

Although the disclosed subject matter has been shown and described primarily with reference to specific aspects, it should be understood by those familiar with the technical field that numerous modifications can be made with regard to configuration and details thereof, without departing from the essence and scope of the invention as defined by the claims hereinafter. The scope of the invention is therefore determined by the appended claims, and the intention is for all modifications to be encompassed which come under the literal meaning or the scope of equivalence of the claims.

LIST OF REFERENCE SIGNS

100 Data processing apparatus
101 Memory
102 Memory locations
103 Access element
104 Integrity checking device
105, 106 Memory areas for checksums
107 Comparator
201 Reference value
202 Check value
301 Reference value
302 Check value
400 Semiconductor chip apparatus
401 Memory
402 Memory locations
403 Access element
404 Integrity checking device
405 Reference value
406 Check value
407 Signal
500 Flowchart
501-503 Processing
The invention claimed is:

1. A semiconductor chip apparatus, comprising:
a memory having a plurality of memory locations;
a memory access element configured to read and write data to and from the memory; and
an integrity check device configured to:
    store a reference value for a check function over values stored in the memory locations;
    generate a check value for the check function by reading the memory locations, and starting from an initial value, updating the check value for each read memory location with the value read from the memory location, to include the value,
    wherein the integrity check device is configured to perform the reading of the memory locations only during an idle period of processing of the memory access element, during which the memory access element does not access the memory, thereby allowing read and write operations of the memory access element to continue without disruption;
    in a case of a write access to a memory location, concurrently update the check value with a value being written by the write access, at the time of the write operation, if the check value represents the check value previously stored in the memory location prior to the write access; and
    compare the reference value with the check value, and output a signal depending on a result of the comparison.
2. The semiconductor chip apparatus as claimed in claim 1, wherein the integrity check device is further configured to generate the check value during times at which the access element need not provide any data for other receivers.
3. The semiconductor chip apparatus as claimed in claim 2, wherein the integrity check device is configured to:
    in a case of write access to the memory by the memory access element, verify whether the write access is to a memory location that stores a value that the integrity check device has already used to update the check value for the check function; and
    if the write access is to a memory location that stores a value that the integrity check device has already updated the check value for the check function, re-read the memory location and adapt the check value to include the value to be written by the memory access rather than the read value.
4. The semiconductor chip apparatus as claimed in claim 1, wherein the check function is a commutative operation on a mapping of the stored values.
5. The semiconductor chip apparatus as claimed in claim 4, wherein the commutative operation is an XOR combination.
6. The semiconductor chip apparatus as claimed in claim 1, wherein the integrity check device is further configured to generate the reference value to represent the values stored in the memory locations, and to adjust the reference value during the write access to represent the value to be written by the write access rather than the value stored in the write-accessed memory location prior to the write access.
7. The semiconductor chip apparatus as claimed in claim 1, wherein the memory is a dual port memory with a first port and a second port, the memory access element is configured to access the memory via the first port, and the integrity check device is configured to read the stored values via the second port, wherein the dual port memory enables simultaneous access to the memory by both the memory access element and the integrity check device.
8. The semiconductor chip apparatus as claimed in claim 1, wherein, to read one of the stored values to generate the check value, the integrity check device is configured to await a time at which the memory access element does not access the memory.
9. The semiconductor chip apparatus as claimed in claim 8, wherein the integrity check device is configured to prohibit access to the memory by the memory access element and to perform a read access to generate the check value on the memory instead if the integrity check device otherwise waits for longer than a maximum period of time for a time at which the memory access element does not access the memory.
10. The semiconductor chip apparatus as claimed in claim 1, wherein the memory access element is a data processing unit that accesses the memory, which is a random access memory or one or more registers.
11. The semiconductor chip apparatus as claimed in claim 1, wherein the integrity check device is further configured to output the signal when the reference value does not match the check value.
12. The semiconductor chip apparatus as claimed in claim 1, wherein the integrity check device is further configured to periodically generate the check value, compare the check value to the reference value, and output the signal depending on a result of the comparison.
13. A method for checking an integrity of a memory, comprising:
    storing a reference value for a check function over values stored in memory locations of the memory;
    generating a check value for the check function by reading out the memory locations;
    starting from an initial value, updating the check value for each read memory location with the value read from the memory location such that the check value includes the value for reading out the memory locations, wherein the reading out of the memory locations is performed only during an idle period of processing of a memory access element, during which the memory access element does not access the memory, thereby allowing read and write operations of the memory access element to continue without disruption;

in a case of a write access by a memory element to a memory location, concurrently updating the check value with a value being written by the write access, at the time of the write operation, if the check value represents the check value previously stored in the memory location prior to the write access; and comparing the reference value with the check value, and outputting a signal depending on a result of the comparison.

* * * * *